Feb. 12, 1924. Re. 15,763
I. W. DOREMUS
GAME
Original Filed May 11, 1921
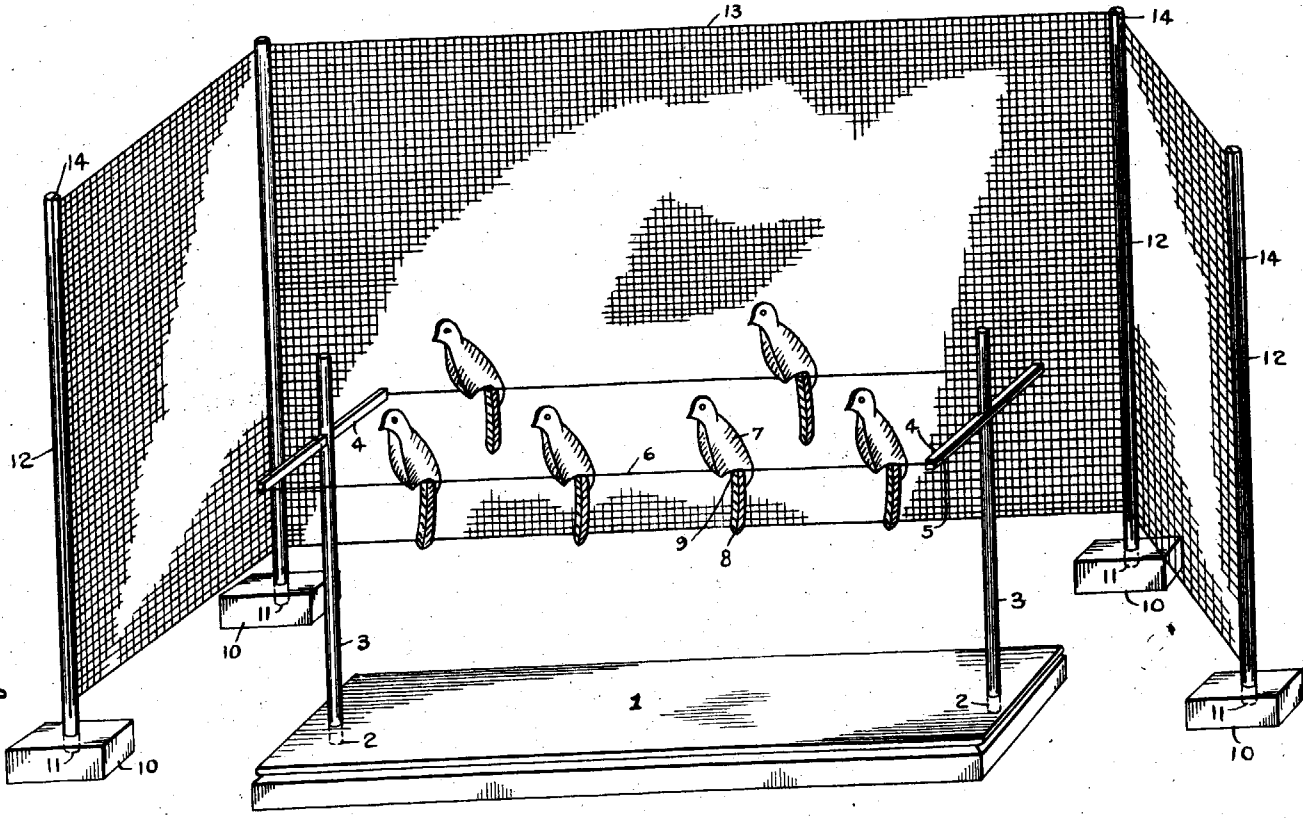
INVENTOR
Isaac W. Doremus
BY
Clarence G. Campbell
his ATTORNEY.

Patented Feb. 12, 1924. Re. 15,763

UNITED STATES PATENT OFFICE.

ISAAC W. DOREMUS, OF WEST ENGLEWOOD, NEW JERSEY, ASSIGNOR, BY MESNE ASSIGNMENTS, TO DOREMUS, SCHOEN & CO., INC., OF NEW YORK, N. Y., A CORPORATION OF NEW YORK.

GAME.

Original No. 1,383,610, dated July 5, 1921, Serial No. 468,682, filed May 11, 1921. Application for reissue filed July 3, 1923. Serial No. 649,222.

*To all whom it may concern:*

Be it known that I, ISAAC W. DOREMUS, a citizen of the United States, residing at West Englewood, in the county of Bergen and State of New Jersey, have invented a new and useful Improvement in a Game, of which the following is a specification.

My invention relates to a game, and more particularly to a combination of elements in a game, as will be more fully hereinafter pointed out.

There have been many games where a group of objects were adapted to be arranged in a position for knocking the same down by means of a projectile thrown or shot thereat. But my device is so arranged that the objects are weighted in the lower part or tail so that they balance perfectly on a flexible or elastic member, and they can therefore only be knocked off by a direct hit of the object or flexible member. The objects are also usually in motion, because they are balanced on the flexible member which readily vibrates.

In the drawing, which is a perspective of the preferred form of my device, 1 is the base member having holes 2 adapted to receive members 3, to which are rigidly secured cross bars 4, which are slotted at 5 so as to receive a flexible or elastic member 6, on which are adapted to be placed objects 7 having tail members 8 which are weighted so that the objects 7 will rest firmly on the flexible member 6 at 9, which is cut away for that purpose.

Secondary base members 10 have holes 11 into which uprights 12 are adapted to be set, and a net 13 is secured to said uprights 12 in slots 14 in said uprights 12.

An elastic or other suitable flexible material may be used for the flexible member 6.

Upright members 3 and 12 are all adapted to be removed from their respective bases, so that the entire device may be packed in a compact manner.

The various members are adapted to be set up for use as shown in the drawing, so that the net will serve as a backstop for the projectiles thrown or shot thereat. The well-known pop gun or other means (not shown) may be used for this purpose.

Variations may be made in the device described and shown herein without departing from the spirit of my invention.

I claim:

1. In a game the combination of a base member supporting upright rigid members, around the upper ends of which is strung a flexible member on which is supported a group of objects resting in balanced position, together with a number of secondary base members each supporting perpendicular uprights on which a net is secured, thereby serving as a backstop for missiles projected at said balanced objects.

2. In a game the combination of a base member supporting upright rigid members having cross trees, around which is stretched an elastic and on which is balanced a group of objects.

3. In a game the combination of a base member supporting upright rigid members, around the upper ends of which is strung a flexible member on which is supported a group of objects resting in balanced position.

4. In a game the combination of a base member supporting upright rigid members, around the upper end of which is strung a flexible member on which is supported a group of objects resting in balanced position and adapted to be knocked therefrom by missiles projected thereat.

5. In a game the combination of a base member supporting upright rigid members, around the upper ends of which is stroung a flexible member on which is supported a group of objects resting in balanced position, and which are so weighted in the tail members as to facilitate the balance thereof.

6. In a game, a group of objects, supports for detachably and swingingly supporting said objects in non-positive fastened relation thereto in balanced position, in combination with means serving as a back stop for missiles projected at said balanced objects whereby said objects are detached from the supports upon impact of the missiles.

7. In a game, a group of objects having weighted tail members to facilitate the balance thereof, supports for detachably and swingingly supporting said objects in non-positive fastened relation thereto in balanced position, in combination with means serving as a back stop for missiles projected at said balanced objects whereby said objects are detached from the supports upon impact of the missiles.

8. In a game, a group of objects, supports for detachably and swingingly supporting said objects in non-positive fastened relation thereto in balanced position, said objects adapted to be detached from the supports upon impact of missiles projected at the same.

In testimony whereof I hereby affix my signature.

ISAAC W. DOREMUS.